Sept. 4, 1956 R. L. ATKINSON 2,761,744
SELF-LAYING VEHICLE TRACK
Filed Oct. 17, 1951 3 Sheets-Sheet 3
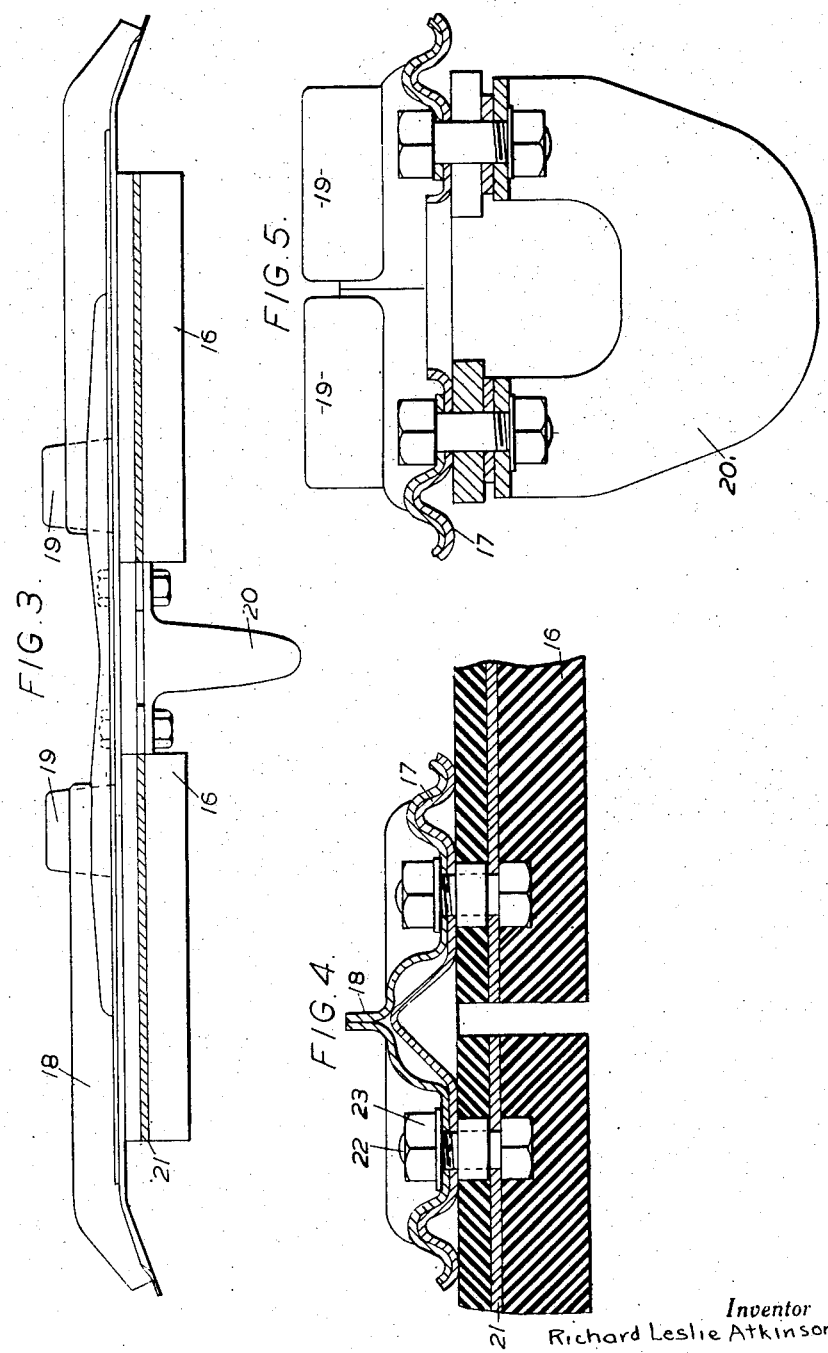

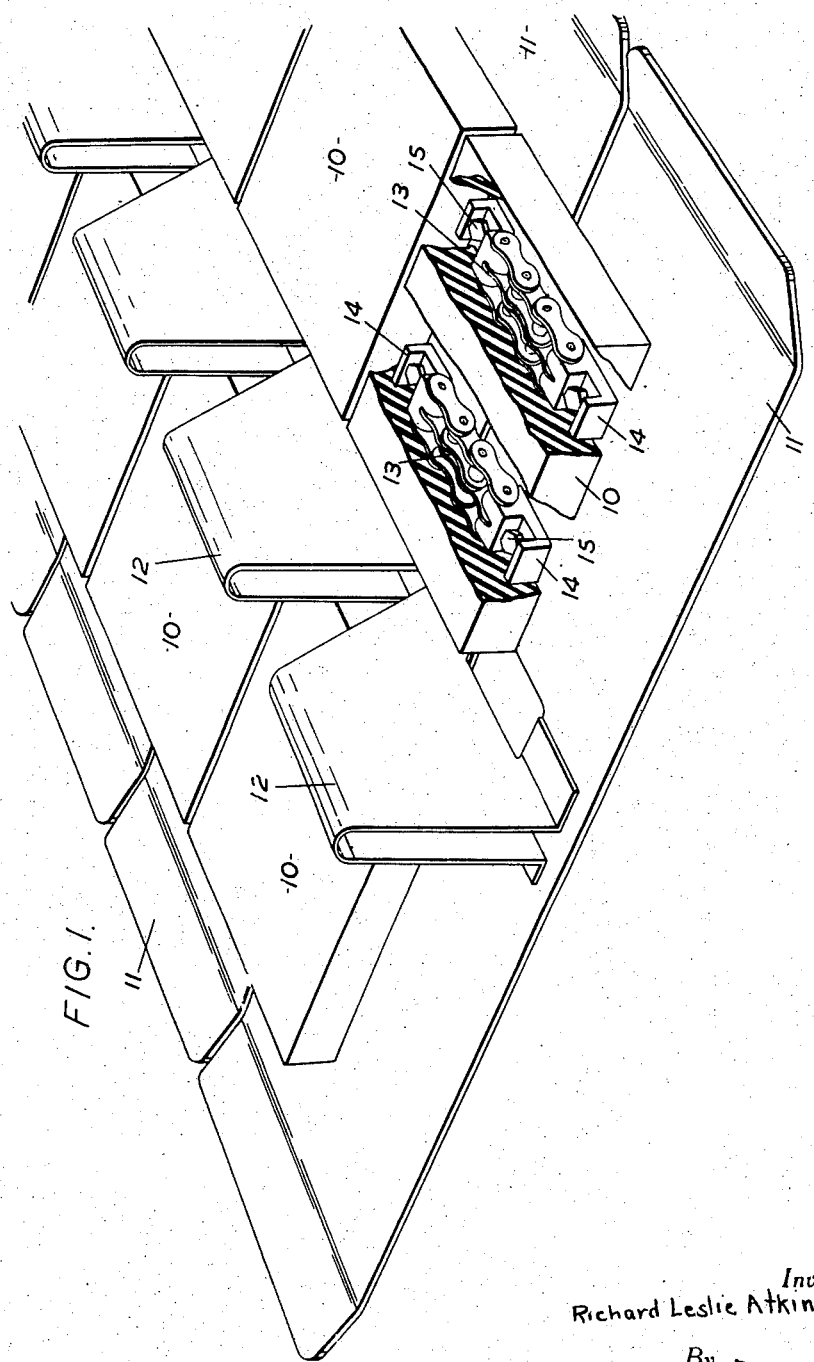

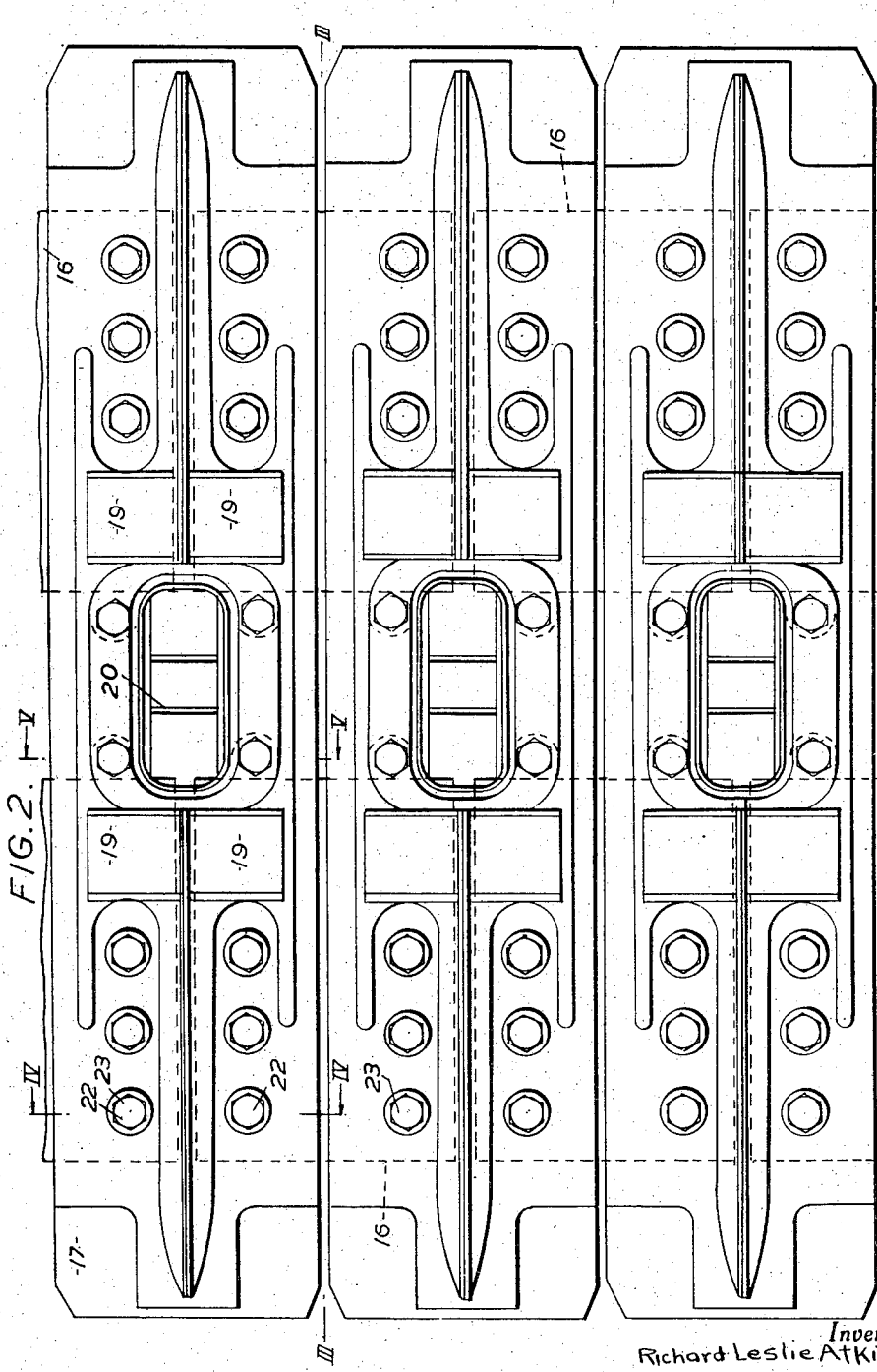

United States Patent Office 2,761,744
Patented Sept. 4, 1956

2,761,744

SELF-LAYING VEHICLE TRACK

Richard L. Atkinson, Clitheroe, England, assignor to Atkinson's Agricultural Appliances Limited, Clitheroe, England Application October 17, 1951, Serial No. 251,702

5 Claims. (Cl. 305—10)

This invention relates to endless self-laying vehicle tracks and the like, of the type suitable for agricultural tractors and other land vehicles, and adapted to be driven by driving means, for example sprocket teeth or friction drums, the vehicle being supported on a plurality of guide wheels which ride on the upper surface of the track.

One object of the invention is to provide a self-laying track which will run smoothly and quietly at high speed. A further object is to distribute the ground load exerted by the track. Another object is to provide a track from which any broken or damaged parts can quickly and easily be individually removed and replaced by a new or repaired part. A still further object of the invention is to provide a smoothly running track of strength and durability, which will be highly flexible yet substantially non-stretching longitudinally.

According to the present invention there is provided a self-laying track of the type aforesaid, comprising a series of separate ground-engaging track members or elements interconnected longitudinally on their upper or inner sides, that is remote from their ground-engaging surfaces, by flexible pads of rubber or other tough resilient moisture-proof material, said pads being disposed close to and substantially abutting each other successively in the longitudinal direction so as to provide an effectively smooth continuous running track having a resilient surface for load supporting engagement with the guide wheels of the vehicle. Embedded in each resilient block intermediate its ends there is a flexible substantially non-extensible tension member, or there may be a plurality of such tension members within each block. Detachable fastening means are provided for each block. The upper portions of the fastening means are embedded in and spaced from the normally flat upper surface of each block so that the resiliency of its upper guide wheel engaging surface will not be impaired. The fastening means are connected to opposite end portions of the tension member and extend downwardly from within the block to provide a disengageable connection between two adjacent track members and the opposite end portions of the tension member. This connection sustains and withstands the tensile stresses in the track and provides for the convenient and rapid removal or replacement of an individual track member or of an individual resilient block which may be worn or damaged. Advantageously, the fastening means may consist of a bolt arranged with its head embedded in and bonded to the resilient material of the block and arranged with its threaded shank portion extending downwardly through the track member where it is positively secured by a nut conveniently accessible from the lower or external surface of the track.

Preferably the resilient pads are arranged in two series on each side of the longitudinal centre line of the endless track, two sets of guide wheels co-operating with the resulting two running tracks, a series of teeth or other drive-receiving track portion being disposed between said running tracks.

Moreover, preferably an inwardly projecting longitudinal guide for the guide wheels is associated with or constituted by said drive-receiving track portion.

Preferably, the tension members are formed by short lengths of roller chain which are highly flexible in the direction of bending of the self-laying track but are substantially non-extensible when subjected to longitudinal tension.

Preferably the ground-engaging track elements are of metal and are substantially rigid and are connected positively and inextensibly with the tension members embedded in the pads. The connections between the pads and track elements may be quickly disconnected and reestablished in order to fit an individual replacement track member or pad, or a section of track, as desired.

Alternatively the flexible tension member may be a spring steel plate which is conveniently substantially coextensive with the rubber pad. Preferably the chain, flexible plate or other tension member is embedded completely within the rubber pad and is bonded thereto.

As an alternative to a metal chain or spring steel plate, a piece of woven asbestos or like stretch-resistant material (similar to machine belting or brake lining) may be used as a tension member and embedded in the rubber pad so as to make it stretch-resistant without seriously impairing its flexibility.

The term "rubber" where used in this specification is intended to include natural and synthetic rubbers and other resilient materials having similar properties and which are suitable for the purpose of the invention.

The invention will be further described, by way of example, and with reference to the accompanying drawings as applied to a self-laying track for use with an agricultural or like tractor.

On the drawings:

Figure 1 is a fragmentary perspective view of a short length of endless self-laying track according to one embodiment of the invention, looking at the upper or interior sprocket-engaging face, that is the side remote from the ground-engaging surface.

Figure 2 is a plan view of a short length of endless track according to a modified form of the invention, looking on the exterior or ground-engaging face.

Figure 3 is a transverse section on the line III—III of Figure 2.

Figure 4 is a longitudinal cross section on the line IV—IV of Figure 2, to a larger scale, and, Figure 5 is a longitudinal cross section on the line V—V of Figure 2 also to a larger scale.

Referring first to Figure 1, the endless self-laying track, of which only a short length is shown, comprises a plurality of rigid metal track members or plates 11 interconnected by rectangular blocks or pads 10 of rubber, each, say, seven inches wide by five inches long and one inch thick, these pads being symmetrically arranged in two rows or series one on each side of the longitudinal centre-line of the endless self-laying track, the pads of each row being only very slightly spaced apart so that their adjacent ends substantially abut each other. The upper surface of each pad 10 is normally flat.

The pads 10 are secured, as hereinafter described, to the rigid metal track members or plates 11 which extend across the full width of the track and beyond the side edges of the rubber pads. The track members 11 have parallel edges which extend transversely of the track in closely spaced relationship. These track members 11 carry the usual track grousers. Rubber road pads (not shown) may be mounted on the ground-engaging face of the track members 11, while at the longitudinal centre line of the track there is provided an inwardly projecting guide comprising a series of "teeth" 12 which guides the track in the usual way, running between the guide wheels of the vehicle (not shown). The series of teeth 12 moreover form a drive-receiving track portion which mesh with the teeth of a power operated driving sprocket (not shown) carried by the vehicle. The track plate may be a stamping or pressing, fabricated if necessary, or it may be a casting, in which case it is preferably of malleable steel.

Moulded into and extending longitudinally intermediate the ends of each rubber pad, and spaced transversely therein, is a flexible tension member formed by a pair of short lengths (e. g., three link lengths) of longitudinally extending double-width roller chain 13 of the kind commonly known as Renold's chain. The ends of each length of chain are coupled to connectors which may comprise metal blocks 14 having recesses which accommodate the heads of bolts 15, the screw-threaded shanks of which extend downwardly through and project beyond the outer or lower face of the pad. These bolts serve to secure the pads to the track plates so that the pads and track plates alternate and the whole comprises a substantially longitudinally inextensible assembly. The roller chain 13, the connectors 14 and the heads of the bolts 15 are completely embedded in and bonded to the rubber pads by one of the known processes for bonding rubber to metal. The fastenings which comprise the metal blocks 14 and the heads of the bolts 15 are spaced beneath the upper or inner normally flat surface of each resilient block so that metal to metal contact between the guide rollers and the fastening devices is prevented and the resiliency of the effectively smooth continuous guide wheel engaging track surface formed by the abutting normally flat upper surfaces of the series of resilient blocks 10 is fully maintained.

It will be clear that the two parallel rows or series of pads 10 provide two substantially continuous smooth resilient running tracks for the guide wheels and which are shock-absorbing and facilitate smooth, fast and quiet operation.

It is a comparatively easy matter to remove and replace any broken or damaged rigid track member or resilient block individually in the endless track which is above described. This is done by removing the nuts from the bolts 15 which secure any of the resilient blocks 10 to the track members 11. The steel roller-chain 13 prevents longitudinal stretch or excessive distortion of the rubber pads 10 whilst at the same time permitting the latter to flex to the extent required to enable the endless self-laying track to run around the driving and guide wheels in a smooth and quiet manner. The fact that the chain is embedded in the rubber or similar resilient moisture-proof material preserves the former against damage and deterioration by rust.

In the embodiment of the invention shown in Figures 2 to 5 the resilient blocks or pads of rubber 16, say, seven inches wide by five inches long and one inch thick, are arranged as before in two longitudinally extending parallel rows on each side of the centre-line, successive pads being very slightly spaced apart and substantially abutting each other to form an effectively smooth continuous running track for the guide wheels.

The pads 16 are secured, as hereinafter described, to track members or plates 17 which extend beyond the ends of the rubber pads. These track plates 17 carry the usual track grousers 18, while rubber road pads 19 are mounted on the lower or outer face and at the centre line of the self-laying track there is provided an inwardly projecting guide or series of "teeth" 20 which engages with the driving sprocket wheels of the vehicle in the usual way and runs between or in grooves in the guide wheels. The track plates 17 may be stampings or pressings, fabricated if necessary, or they may be a cast, in which case they are preferably formed of a malleable steel.

The rubber pads 17 are each moulded around a thin flexible plate 21 of spring steel (e. g., one sixteenth of an inch thick) the periphery of which is substantially coterminous with the lateral periphery of the pad. Six screw threaded studs such as 22 are welded or otherwise secured to the plate 21 so as to project downwardly or outwardly through the rubber in which the plate itself is well embedded. In moulding the rubber pad 17 around the plate, the rubber is also bonded to the plate by one of the known processes for bonding rubber to metal. Three of the aforementioned studs 22 of each pad serve to bolt it to one of the adjacent track plates, whilst the the other three studs 22 of each pad serve to secure it to the adjacent track plate to which it likewise extends.

A broken or damaged part is easily removed by removing the nuts 23 from the studs 22. The steel plate 21 prevents appreciable elongation of the track under tension or excessive distortion of the rubber whilst at the same time permitting the latter to flex to the extent required. The rubber preserves the steel plate against damage and deterioration by rust.

It will further be evident that the ground pressure load exerted by the vehicle through the wheels running on the smooth resilient track surface formed by the abutting resilient blocks 17 will inherently be distributed at each loading point over more than one track element owing to the association of the pads with the track elements, each pad bridging two adjacent track elements. As a result the maximum ground pressure per unit of ground area is reduced.

If it is desirable that the teeth 12 of the guide (Fig. 1) should be strengthened in order to stand up under the stresses involved; this may be done, for example, by closing the open ends of the tooth walls or, alternatively, by providing solid teeth.

What is claimed is:

1. An elongated flexible track adapted to be formed into an endless self-laying ground engaging track for the support of a vehicle having a plurality of longitudinally spaced guide wheels for load supporting and guiding engagement with said track, said track comprising: a series of transversely extending rigid track members each having inner and outer surfaces and parallel transversely extending edges; a series of aligned rectangular blocks each formed of tough resilient moisture-proof material and each having a normally flat inner surface and an outer surface, said outer block surfaces being engaged by said inner track member surfaces, each of said blocks extending between two adjacent ones of said track members with its ends slightly spaced from and substantially abutting the ends of adjacent blocks close to the central transverse axes of both track members between which it extends, whereby said inner surfaces of said series of blocks form an effectively smooth continuous resilient track surface adapted for load supporting engagement with said guide wheels; a flexible substantially non-extensible tension member embedded in each block and extending longitudinally thereof intermediate the ends of said block; and a plurality of detachable fastening means spaced outwardly of said normally flat inner surface of each block and extending outwardly from within said block and from opposite end portions of each tension member, said fastening means connecting said end portions of said tension member to said two adjacent track members between which said block extends, whereby any of said track members or said blocks may be individually removed from said track and replaced therein.

2. A track according to claim 1, wherein said tension member comprises at least one length of roller chain flexible about a plurality of bending axes parallel to said track member edges.

3. A track according to claim 1, wherein said tension member comprises a normally flat plate formed of flexible spring steel extending parallel to and spaced outwardly from said normally flat inner surface of the block within which it is embedded.

4. A track according to claim 1, wherein said track members comprise portions which extend inwardly and form a series of teeth adapted for meshing engagement with a power operated sprocket wheel of said vehicle, said series of teeth being arranged along the central longitudinal axis of said track, and in which said series of blocks is arranged in two parallel rows laterally disposed on opposite sides of said series of teeth to provide a pair of symmetrically arranged resilient track surfaces for load supporting engagement with said guide wheels.

5. A track according to claim 1, wherein said fastening means comprises a plurality of bolts, each bolt having a head portion embedded in said resilient block and a threaded shank portion which extends through one of said two adjacent track members, said fastening means further comprising a nut threaded on said shank portion and securing said bolt to said one of said two track members.

References Cited in the file of this patent

UNITED STATES PATENTS

| | | |
|---|---|---|
| 1,068,563 | Carr | July 29, 1913 |
| 1,300,814 | Burch | Apr. 15, 1919 |
| 2,273,949 | Galanot et al. | Feb. 24, 1942 |
| 2,273,950 | Galanot et al. | Feb. 24, 1942 |
| 2,494,066 | Slemmons | Jan. 10, 1950 |